Figure 1:
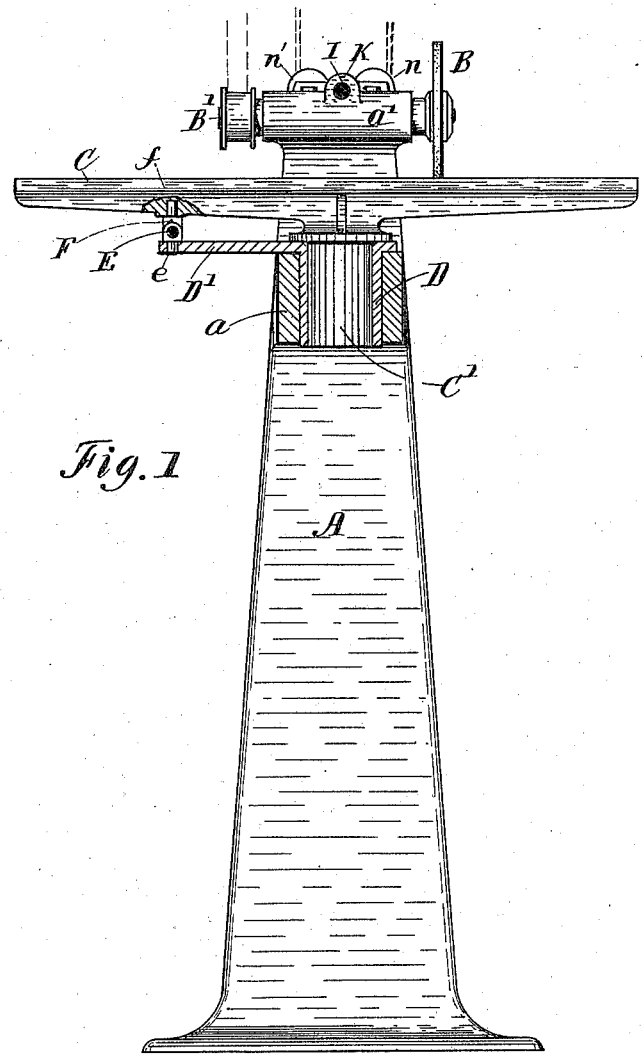

(No Model.)  3 Sheets—Sheet 1.

H. G. BARR.
CUTTER AND REAMER GRINDER.

No. 575,319.  Patented Jan. 19, 1897.

Witnesses.  Inventor.

(No Model.) 3 Sheets—Sheet 2.

H. G. BARR.
CUTTER AND REAMER GRINDER.

No. 575,319. Patented Jan. 19, 1897.

Witnesses. Inventor.

(No Model.)  
3 Sheets—Sheet 3.

H. G. BARR.
CUTTER AND REAMER GRINDER.

No. 575,319.  
Patented Jan. 19, 1897.

Witnesses.  
Inventor.

UNITED STATES PATENT OFFICE.

HENRY G. BARR, OF WORCESTER, MASSACHUSETTS.

CUTTER AND REAMER GRINDER.

SPECIFICATION forming part of Letters Patent No. 575,319, dated January 19, 1897.

Application filed July 27, 1896. Serial No. 600,600. (No model.)

*To all whom it may concern:*

Be it known that I, HENRY G. BARR, a citizen of the United States, residing at Worcester, in the county of Worcester and State of Massachusetts, have invented a new and useful Improvement in Cutter and Reamer Grinders, of which the following, together with the accompanying drawings, is a specification sufficiently full, clear, and exact to enable persons skilled in the art to which this invention appertains to make and use the same.

The object of my present invention is to provide, for the purpose named, a machine of great simplicity, few parts, and requiring few attachments to do the work in a practical and expeditious manner.

Another object is to provide a convenient, simple, and efficient means for the pivotal support and lateral-swinging adjustment of the bed or table whereon the work-supporting devices are to be mounted, in combination with the stand or frame supporting the grinding-wheel and its axis.

Another object is to provide an endwise-adjustable quill, spindle, and grinder for internal or other work, disposed approximately at a right angle to the main grinding-wheel stand and in combination therewith, as more fully hereinafter explained; also, to afford efficient operating devices for said grinder.

These objects I attain by the mechanism illustrated in the drawings, wherein—

Figure 2:
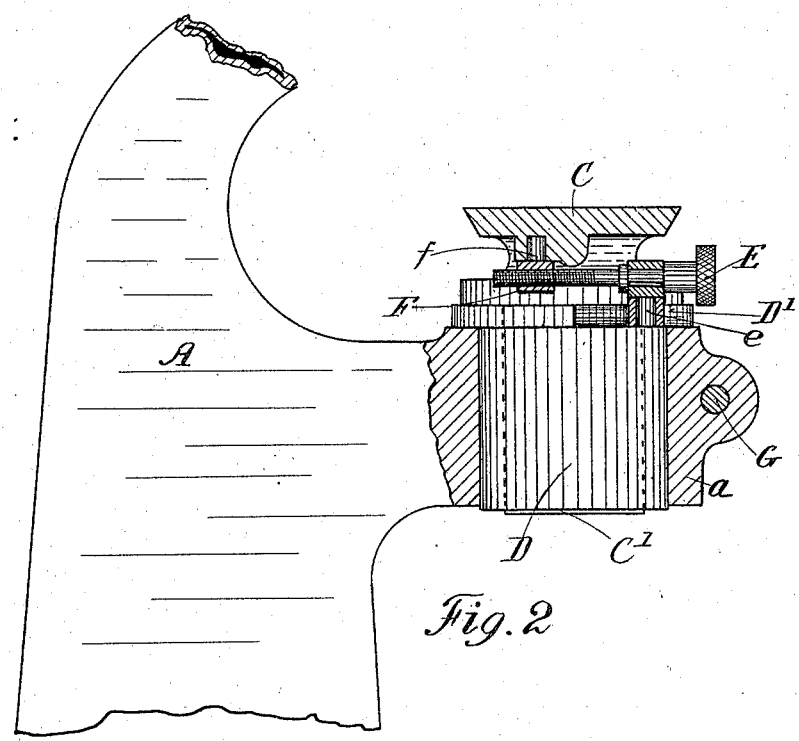
Figure 3:
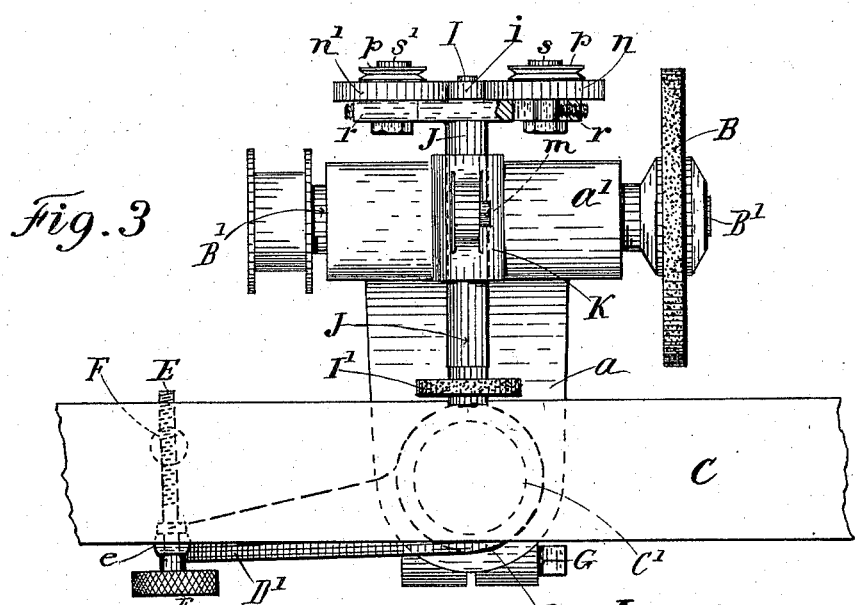
Figure 4:
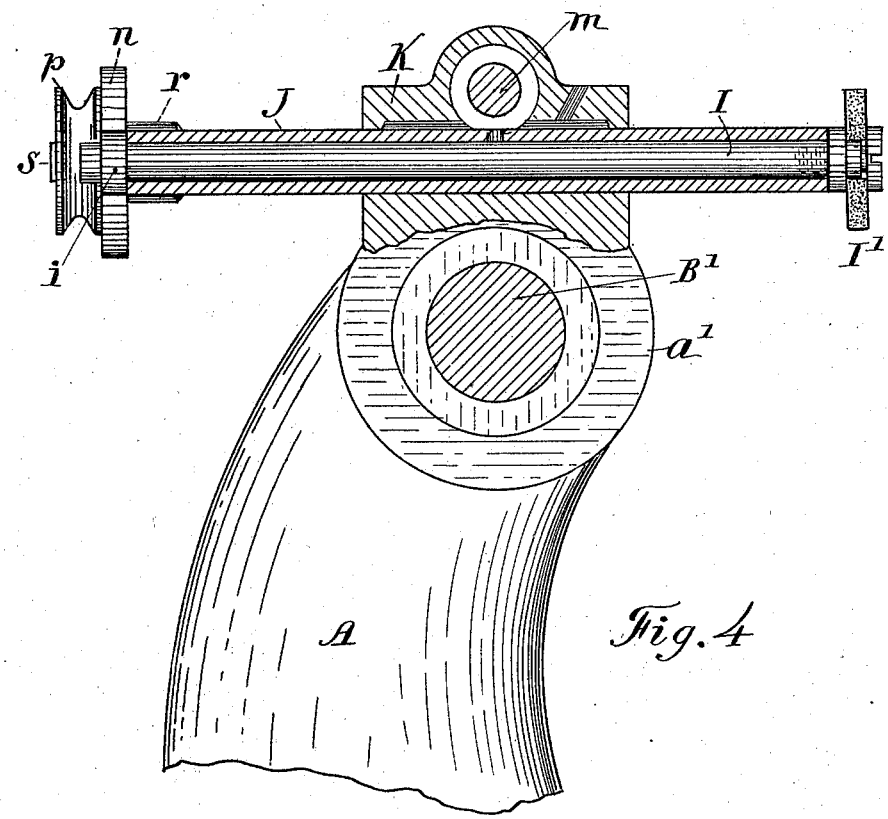
Figure 5:
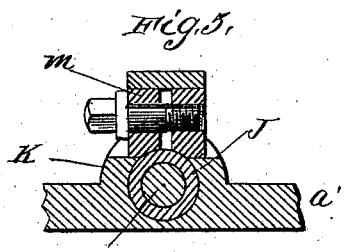

Figure 1 is a front elevation, partly in section, showing such parts of a grinding-machine as are involved in my invention. Fig. 2 is a vertical sectional view transversely of the table and with the frame-bearing in central section. Fig. 3 is a top plan view of the improved mechanism. Fig. 4 is a cross-section showing the small spindle, its endwise-adjustable bearing-quill and operating devices; and Fig. 5 shows a cross-section of the spindle, its bearing-quill and binder.

In the present drawings I have not shown the sliding carriers and appliances for supporting the work while grinding it, as such parts are well known and are not of my invention. It will be understood, however, that in practice such appliances can be employed, mounted upon the table or bed, which is here shown, the same being arranged and manipulated substantially as heretofore employed or in any suitable manner for presenting the work to the grinding-wheel, the general operations, however, being qualified and improved by the actions incident to the combinations herein shown and described.

Referring to parts, A indicates the frame or stand; B the grinding-wheel, having its arbor B' mounted to rotate in a bearing $a'$ on said stand, and C the table or bed on which the work-holding appliances are in practice mounted. Said table C is supported upon an arm $a$ of the frame by a central upright pintle, hub, or trunnion C', which, in accordance with my improvement, is combined with a bushing or sleeve D, arranged in the arm $a$ of the frame, concentrically surrounding the hub C', and supporting the table, the said bushing having a rigid laterally-projecting arm or extension D' thereon, its outer end supporting a screw E, which connects by a suitable nut F with the table C at a distance from the common axis of the table and bushing. The screw E and the nut F are respectively provided with facilities for swiveling action in their connection with the arm and table, as indicated at $e$ and $f$.

The common axis of the table and bushing is so located in relation to the grinding-wheel that in swinging the table forward or backward the work which is carried upon the table is made to approach toward or recede from said grinding-wheel B. In other words said axis is located forward of a vertical plane passing through the grinder-arbor axis and at one side of the plane of the grinding-wheel disk. Hence horizontal swing of the table varies the inclination relatively to both said planes, and to either right or left direction, as desired.

A suitable binder G is provided for clamping the bushing D at positions of its adjustment in the frame, while the table is retained and adjusted relatively to the bushing by the screw E and arm D'.

The table and bushing can both swing on their same vertical axis, thereby affording, by movement of the bushing in the arm, a quick adjustment for placing the table, and then by the movement of the table-hub within the bushing, by operation of the screw E, a method of fine adjustment while grinding work.

When the work is in contact with the wheel B, the accurate and required size is given to the work by turning the screw, the bushing D meanwhile being fastened in the frame $a$ as securely as the operator may desire by the binding device at G. By this combination, in connection with the usual work-supporting attachments, (not shown,) I produce a mechanism that can be conveniently used in grinding cutters of various shapes and which requires but a minimum amount of time in setting up or adjusting the machine for any particular occasion.

Another feature of my invention consists in the provision of a small spindle I for the internal grinding of tubular pieces or other work, and disposed at a right angle, or substantially so, with the main grinder arbor or spindle. (This mechanism is best shown in Figs. 3 and 4.) The spindle I, which carries the grinding-wheel I' at its front end, is mounted to rotate within a quill or tubular bearing J, that is supported and endwise adjustable in a suitable guide or bearing K at the top of the main stand and held by the suitable binder $m$, as required. This small grinder-spindle can be projected more or less over the table by adjustment of the quill J endwise in the stand, which is readily effected by loosening the binder $m$ and sliding the quill within its bearing K forward or backward to the positon desired and then retightening the binder. The advantage of this is that the small grinder-spindle is in the wheel-stand with the main spindle and approximately at right angles to it, which enables me, with the combination of devices shown in Figs. 1 and 2 and with a cross-slide (not shown) of the usual kind, to do in a new and advantageous manner the class of work usually done in a chuck on a grinding-machine.

For rotating the spindle I and the emery-wheel I' mounted thereon I employ means such as are shown in Figs. 3 and 4. The spindle is provided with a friction wheel or surface $i$ upon its rear end, while opposite friction-wheels $n$ and $n'$ are arranged to roll against said surface $i$, each of which has a sheave or pulley $p$ fixed to its side. Said wheels $n\,n'$ are mounted to turn on axial studs $s\,s'$, adjustably supported on brackets $r\,r$, fixed to the rear part of the endwise-adjustable quill J, as indicated. The driving-belt passes about both of the sheaves and simultaneously rotates the two wheels $n\,n'$, which act by frictional contact upon the surface or roll $i$ to transmit power and motion to the spindle I without creating unequal side pressure of said spindle against its bearings, but giving an easy and steady motion without excessive vibration or jar in the running of the wheel I'.

What I claim as of my invention, and desire to secure by Letters Patent, is—

1. In a grinding-machine, the combination, as described, of the supporting-stand, the bushing pivotally supported in the stand and having thereon a radially-projecting arm, as shown, means for rotatively retaining or releasing said bushing, the table pivotally supported within said bushing, and the adjusting-screw laterally connecting the outer end of the arm of the bushing with the projecting portion of the table, for operation in the manner set forth.

2. In a grinding-machine, the combination with the frame having the forward projection, the grinding-wheel, and grinding-wheel arbor mounted in the stand at the top of the frame; of the table and the bushing having an arm, said table and bushing pivotally mounted upon said forward projection with a common pivotal axis, a binder for securing said bushing, the adjusting-screw connecting said arm and table, and swiveling devices for the attachment of said screw to the connected parts, for the purposes set forth.

3. In a grinding-machine, in combination with the main grinding-wheel stand; the endwise-adjustable quill and spindle supported in said stand approximately at right angles to the main grinder-spindle, substantially as and for the purpose set forth.

4. In a grinding-machine, the combination with the endwise-adjustable quill and small grinder-spindle, mounted in the stand approximately at right angles to the main grinding-wheel arbor; of the friction-wheels and their attached sheaves, said friction-wheels oppositely acting against a wheel or surface on the end of said spindle, the brackets fixed to said quill, and the axial studs for said friction-wheels, supported in said brackets, substantially as set forth.

Witness my hand this 23d day of July, 1896.

HENRY G. BARR.

Witnesses:
CHAS. H. BURLEIGH,
FRANK A. HUMPHREY.